United States Patent [19]

Sakuma et al.

[11] Patent Number: 4,887,467
[45] Date of Patent: Dec. 19, 1989

[54] TEMPERATURE-COMPENSATING CIRCUIT FOR ACCELEROMETERS

[75] Inventors: Kazuhiro Sakuma; Yasuhiko Fukumoto; Akihiro Tomioka, all of Akishima, Japan

[73] Assignee: Japan Aviation Electronics Industry Ltd., Tokyo, Japan

[21] Appl. No.: 238,865

[22] Filed: Aug. 30, 1988

[30] Foreign Application Priority Data

Sep. 9, 1987 [JP] Japan ................................ 62-224046

[51] Int. Cl.$^4$ ............................................. G01P 15/13
[52] U.S. Cl. .................................................. 73/517 B
[58] Field of Search ................... 73/497, 517 R, 517 B

[56] References Cited
U.S. PATENT DOCUMENTS

| 3,882,731 | 5/1975 | Koning | 73/497 |
| 4,083,237 | 4/1978 | Levesque | 73/497 |
| 4,128,010 | 12/1978 | Aske | 73/497 |
| 4,144,764 | 3/1979 | Hartzell, Jr. | 73/497 |
| 4,598,586 | 7/1986 | Danielson | 73/517 B |
| 4,658,647 | 4/1987 | Shintani et al. | 73/517 B |

Primary Examiner—John Chapman
Assistant Examiner—Robert P. Bell
Attorney, Agent, or Firm—Bierman and Muserlian

[57] ABSTRACT

A temperature-compensating circuit for a capacitive or prezoelectric resistive accelerometer comprising a flexure with torquer coils subjected to physical changes in response to the linear accelerations, capacitive or piezoelectric resistive elements for detecting strain of the flexure, elements for amplifying the detected output and a negative feedback amplifier for supplying the output to the torquer coils. The output of the piezoelectric resistive element and the resistance of the torquer coils are affected considerably by the temperature change whereby the gain of the feedback amplifier changes. Accordingly, in the circuit of the present invention, the temperature change in the total gain of the accelerometer is removed by adding resistance elements to the negative feedback amplifier so as to cancel the positive temperature coefficient of resistance of the torquer coil and other elements.

1 Claim, 4 Drawing Sheets

FIG. 5
FIG. 6
FIG. 7
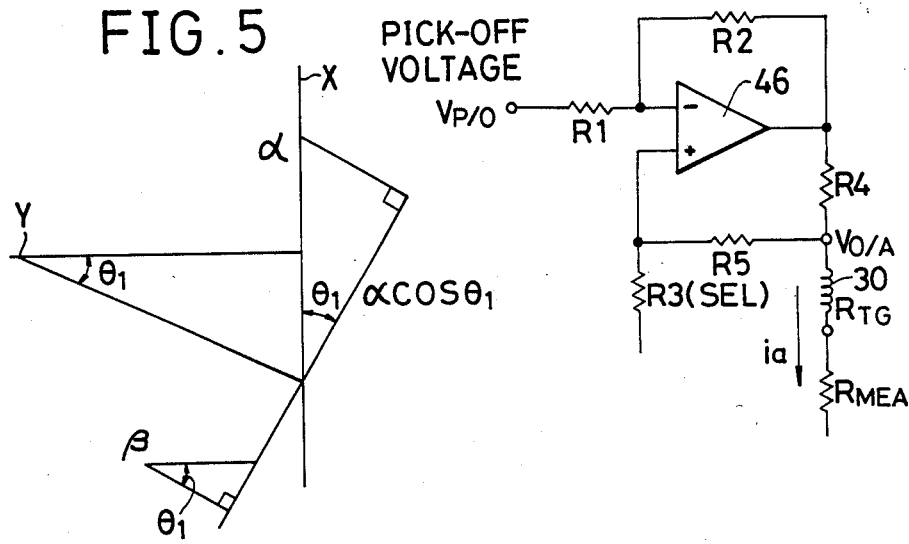
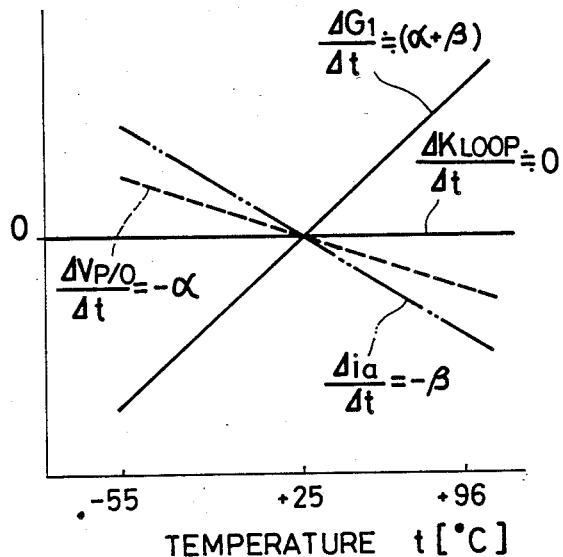

TEMPERATURE-COMPENSATING CIRCUIT FOR ACCELEROMETERS

TECHNICAL FIELD

This invention relates to a temperature-compensating circuit for accelerometers, and more particularly to a circuit for stabilizing the operation of an accelerometer over a wide temperature range.

BACKGROUND OF THE INVENTION

It is well known in the art that a capacitive or piezoelectric resistive accelerometer comprises a case or housing, a pair of magnetic units including a pair of magnetic structures mounted in the housing, and a flapper or flexure member composed of fused quartz coated with metal. The flapper is interposed between the magnetic units and flexurally mounted relative to the housing. Two coils are respectively mounted on opposite sides of the flapper so as to encircle each of permanent magnets which form part of the magnet unit. As the object or vehicle to which accelerometer is mounted is accelerated, the flapper tends to remain stationary in space, thus moving relative to the magnetic structures. Two capacitors are formed on each side of the flapper and, as the flapper moves relative to the magnetic structures, the capacitance of one of the capacitors increases and the capacitance of the other capacitor decreases. These capacitors are employed in connection with a balance circuit to produce a direct current which is proportional to the acceleration and is fed back to the coils of the accelerometer to restore the flapper.

This type of accelerometer can be used in a portion of aircraft or spacecraft navigation or guidance systems. Accordingly, the temperature in the operating environment of the accelerometer changes over a wide range. Consequently, special care must be taken to the elements of the accelerometer to measure the acceleration with a high accuracy over a wide range of temperature.

In view of the foregoing, U.S. Pat. No. 4,658,647 discloses means for avoiding erroneous factors depending upon a change in ambient temperature from the accelerometer.

Further, for example, U.S. Pat. No. 4,498,342 discloses that another type of accelerometer having a microcircuitry which includes a strain bridge, a preamplifier, a summing amplifier, driver amplifier and a readout resistor. The bridge includes four strain sensitive resistors connected in a bridge circuit and having input terminals energized with direct current, and output terminals giving a direct current bridge signal representative of the deviation of the flexure from its mechanical null.

Even though the accelerometer is constructed to minimize the effects of the temperature change, electronic elements and resistors are considerably affected by it. This conducts the accelerometer to unstability.

OBJECTS OF THE INVENTION

In the light of the foregoing, it is an object of the present invention to provide a temperature-compensating circuit for correcting error in the output of the electronic circuit of the accelerometer depending upon the temperature change.

It is a further object of the present invention to provide a temperature-compensating circuit of the accelerometer for correcting the strain of the piezoelectric resistive elements and change of the output of the electronic circuit of the accelerometer due to the temperature change by using a negative feedback amplifier.

It is an object of the present invention to provide a temperature-compensating circuit of the accelerometer to prevent erroneous operation of an electronic circuit due to the temperature change whereby the accelerometer can reliably operate over a wide range of temperature.

BRIEF DESCRIPTION OF THE DRAWINGS

FIG. 5 is a schematic view illustrating a relation between the loop gain and the movement of the flapper;

FIG. 6 is a schematic diagram of the temperature-compensating circuit according to the present invention; and FIG. 7 is a graph showing the temperature change of a negative feed back loop in the wiring circuit according to the present invention.

DESCRIPTION OF THE PREFERRED EMBODIMENT

Figure 1:
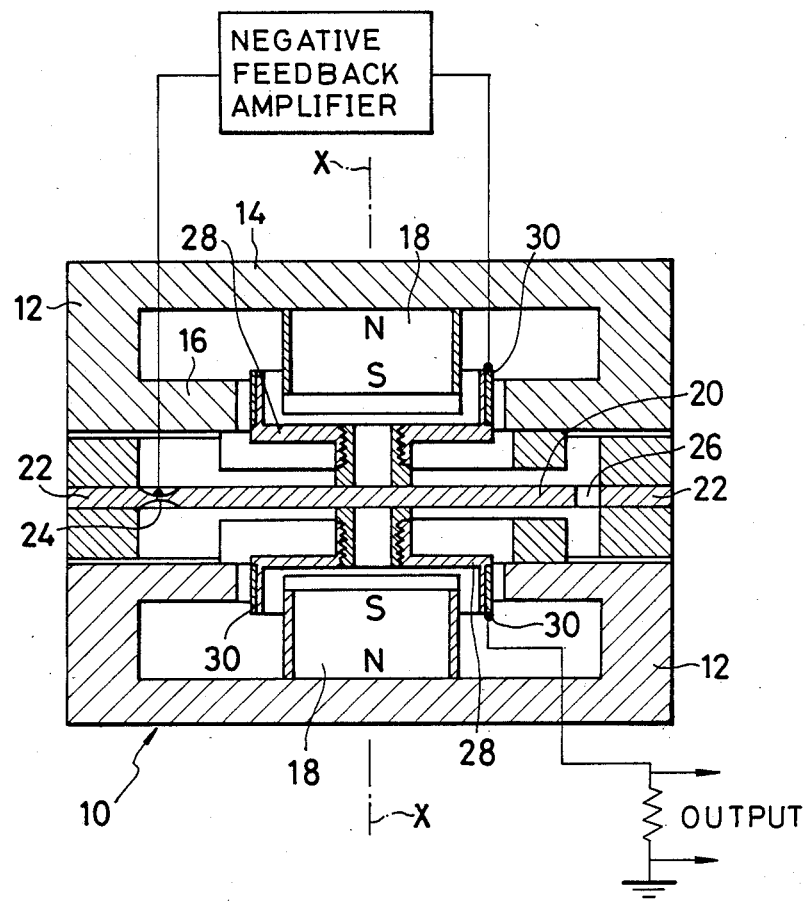
FIG. 1 is a schematic sectional view illustrating the accelerometer according to the present invention.

Referring now to the drawings, as shown in FIG. 1, an accelerometer 10 according to the present invention includes a pair of hollow casing members 12 which are of magnetic material and cylindrical about an axis X—X.

Each of the hollow casing members 12 is provided with a planar end wall 14 and a ring portion 16 inwardly projected from the cylindrical wall of the casing member 12. A disk-like permanent magnet 18 is secured to the back surface of the end wall 14 and one of the poles of the magnet 18 is contacted with the back surface of the planar end wall 14.

A flapper 20 is of circular configuration, made of nonmagnetic metal and hingedly supported between a pair of magnetic structures including the permanent magnets 18 by a supporting ring 22. A portion of the periphery of the flapper 20 is connected with a supporting ring 22 by means of its hinged portions and the remaining portion of the periphery is separated from the supporting ring 22 through a narrow gap 26.

Two bobbins 28 are securely fastened to the upper and lower surfaces of the flapper 20 respectively and torquer coils or windings 30 are respectively wound around each of the bobbins 28.

Figure 2:
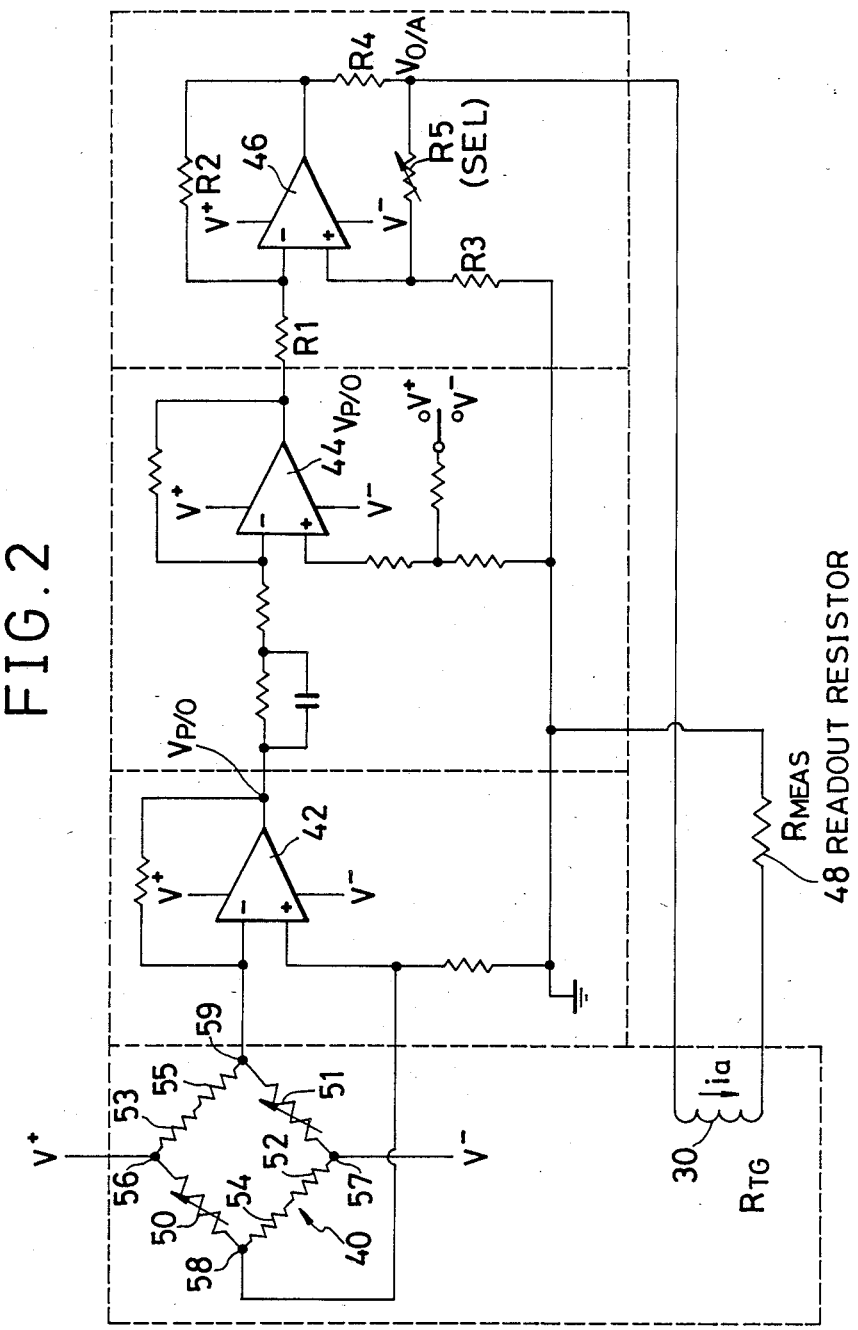
FIG. 2 is a schematic wiring diagram showing circuitry usable in practicing the present invention.

In general, as shown in FIG. 2, the electronic circuit of the accelerometer includes a strain bridge circuit 40, a differential detecting circuit including a preamplifier 42, a signal conditioning circuit including a summing amplifier 44, a negative feedback circuit having a driver amplifier 46, torquer coils 30 and a readout resistor 48.

The bridge circuit 40 is composed of a pair of piezoresistive strain elements 50 and 51, a pair of fixed resistors 52 and 53, resistors 54 and 55 which are connected in series with the fixed resistors 52 and 53 respectively, input terminals 56 and 57 to supply a direct current to the bridge circuit 40 and output terminals 58 and 59.

When the accelerometer is subjected to acceleration, the flapper is deviated from its neutral position. As a result a direct current bridge signal representative of the deviation of the flapper 20 occurs at the output of the bridge circuit 40. This bridge signal is amplified in the preamplifier 42.

Figure 3:
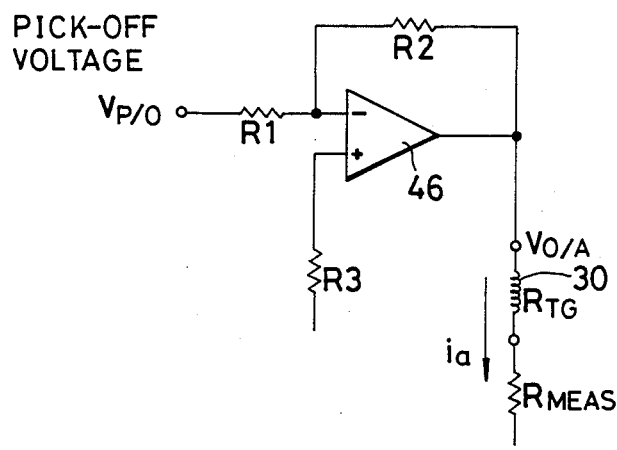
FIG. 3 is a conventional wiring circuit of the accelerometer in the prior art.

The output of the summing amplifier 44 energizes the driver amplifier 46, the output of which in turn is supplied through the torquer coils 30 to the readout resistor 48, and the flapper 20 is returned back to the original null position. FIG. 3 shows an above-mentioned conventional circuit for the accelerometer.

Now consideration will be taken into the temperature change with respect to the electronic circuit including piezoresistive elements.

Figure 4:
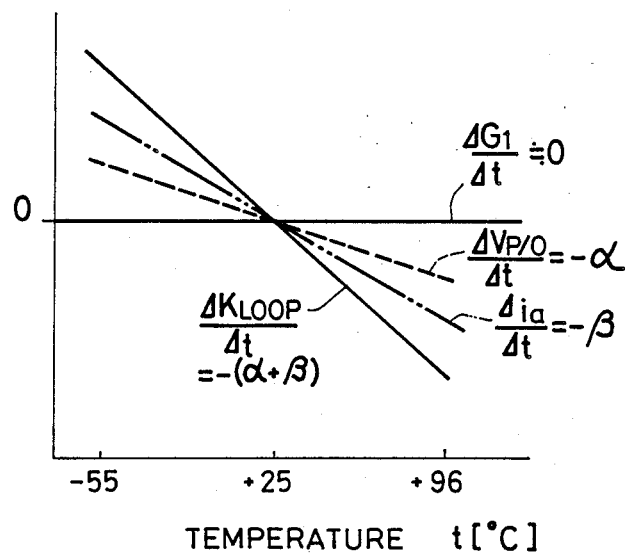
FIG. 4 is a graph showing a relation between negative feed back loop gain and the temperature change according to the conventional wiring circuit of the accelerometer.

The pick-off voltage (V P/O) to be applied to the driver amplifier 46 has negative temperature coefficient ($-\alpha$), as shown in FIG. 4 in which the temperature change is plotted in abscissa. Since the gain of the driver amplifier 46 is substantially decided by resistances $R_1$ and $R_2$, the sensitivity of the output (V O/A) of the driver amplifier will have a negative temperature coefficient as well as the sensitivity of the pick-off voltage (V P/O).

Consequently, provided that the torquer coil 30 has a positive temperature coefficient and positive resistance (R TG), the current (ia) passing through the coil 30 is shown as follows:

$$ia = \frac{V\ O/A}{R\ TG + R\ MAS}$$

(where R MAS is the resistance of the readout resistor 48.)

Therefore, the current (ia) passing through the torquer coil 30 has a negative temperature coefficient ($-\beta$), as shown at $\Delta ia/\Delta t = -\beta$ in FIG. 4.

Since the loop gain of the accelerometer is in proportion to the sensitivity of the pick-off voltage (V P/O), the gain ($G_1$) of the amplifier 46 and the current (ia) passing through the torquer coil 30, the temperature coefficient of the loop gain of the accelerometer will be given as follows:

Temperature coefficient ($\Delta K\ LOOP/\Delta t$) = $-(\alpha+\beta)$

Usually, the phase compensation and adjustment of the loop gain of the accelerometer are carried out at a normal temperature, about 25° C. If the accelerometer is exposed to the environment at a high temperature such as for example +96° C., the loop gain of the accelerometer will be decreased.

Thus, as shown in FIG. 5, assuming that when acceleration ($\alpha$) is applied to an ideal input axis X of the accelerometer and acceleration ($\beta$) is applied to an axis Y which is perpendicularly intersecting the input axis X, and then the flapper 20 is deviated from its neutral position at an angle of $\theta$ 1, the deviated angle $\theta$1 of the flapper will be represented as follows:

$$\theta_1 = (\alpha\cos\theta_1 + \beta\sin\theta_1) \times \frac{1}{K_{LOOP}}$$

When the accelerometer is exposed to the environment at the above-mentioned high temperature, the sensitivity of acceleration ($\alpha$) to be measured will be decreased and the dynamic range will be lowered. Since the deviation of the flapper 20 is inverse proportion to the loop gain (K LOOP) and at a high temperature the deviation of the flapper will be reduced, a linear error will be increased and the accuracy of the accelerometer will be decreased.

As a result of the above consideration, in the circuit according to the present invention, as shown in FIGS. 2 and 6, there are resistors R4 and R5 (SEL) in the feedback portion including the driver amplifier 46.

That is, since the gain of the amplifier 46 changes in response to the change of the load to be applied to it. That is, since the torquer coil 30 has a positive temperature coefficient, the gain of the amplifier 46 also has a positive temperature coefficient.

Consequently, when the above positive temperature coefficient is selected to cancel the negative temperature coefficient as to the sensitivity (output) of the pick-off voltage (V P/O) and the current (ia) passing through the coil 30, the gain of the negative feedback loop will become zero, as shown in FIG. 7.

According to the present invention, the change of the temperature of the resistance of the torquer coil 30 of the accelerometer is used to cancel the temperature change of the gain of the negative feedback so that the loop gain may be independent of the temperature change.

While the invention has been particularly shown and described with reference to the preferred embodiment for piezoelectric resistive pickoff accelerometer it will be skilled in the art by those skilled in the art that the same can be made for capacitive pickoff accelerometer without departing from the spirit and scope of the invention.

What is claimed is:

1. A temperature-compensating circuit for an accelerometer comprising a pair of torquer coils respectively mounted on the opposite surface of a flapper interposed between a pair of magnetic structures, capacitors or a strain bridge including piezoelectric resistive elements for detecting the the deviation of the flapper from its neutral position in response to acceleration to be applied to the accelerometer and giving a direct current bridge signal representative of the deviation, a preamplifier for amplifying the direct current, a summing amplifier connected with the preamplifier, a negative feedback amplifier including a driver amplifier energized by the output of a summing amplifier, the output of the negative amplifier being supplied to the torquer coils in order to restore the flapper to its neutral position and to balance the capacitor output or to reduce the bridge output to null, a readout resistor for passing across the output of the feedback amplifier to obtain a measure of the acceleration, and for correcting the temperature change in the gain of the negative feedback amplifier to cancel the temperature change in the resistance of the torquer coil, piezoelectric resistive elements or other elements in the loop whereby obtaining the least temperature change in the total loop gain of the accelerometer.

* * * * *

UNITED STATES PATENT AND TRADEMARK OFFICE
CERTIFICATE OF CORRECTION

PATENT NO. : 4,887,467
DATED : Dec. 19, 1989
INVENTOR(S) : KAZUHIRO SAKUMA; YASUHIKO FUKUMOTO; and AKIHIRO TOMIOKA It is certified that error appears in the above-identified patent and that said Letters Patent is hereby corrected as shown below:

| Col. | Lines | |
|---|---|---|
| 4 | 52 to 53 | "the negative amplifier" should be --the negative feedback amplifier-- |
| 4 | 57 | after "and" insert -- wherein one of said torquer coils comprises a resistive element connected to the negative feedback amplifier-- |

Signed and Sealed this

Fifth Day of November, 1991

Attest:

HARRY F. MANBECK, JR.

Attesting Officer

Commissioner of Patents and Trademarks